United States Patent [19]

Horne et al.

[11] Patent Number: 5,524,083

[45] Date of Patent: Jun. 4, 1996

[54] DECENTRALIZED, MODULAR TRIPPING ARRANGEMENT

[75] Inventors: George M. Horne, Cary, N.C.; Ronald L. Farrington, Nevada, Iowa

[73] Assignee: Square D Company, Palatine, Ill.

[21] Appl. No.: 397,540

[22] Filed: Feb. 28, 1995

Related U.S. Application Data

[63] Continuation of Ser. No. 144,089, Oct. 27, 1993, abandoned, which is a continuation-in-part of Ser. No. 626,669, Feb. 5, 1991, abandoned, which is a division of Ser. No. 175,992, Mar. 31, 1988, Pat. No. 4,996,646.

[51] Int. Cl.⁶ ..................................................... G06F 15/56
[52] U.S. Cl. .......................... 364/492; 364/483; 307/126; 307/132 E; 307/140
[58] Field of Search .................................. 364/483, 492, 364/493, 132, 138, 139; 307/125, 126, 130, 131, 132 E, 140

[56] References Cited

U.S. PATENT DOCUMENTS

| | | | |
|---|---|---|---|
| 4,419,667 | 12/1983 | Gurr et al. | 340/825.06 |
| 4,528,662 | 7/1985 | Floyd et al. | 370/92 |
| 4,647,914 | 3/1987 | Alexander | 379/44 |
| 4,698,748 | 10/1987 | Juzswik et al. | 364/200 |
| 4,705,997 | 11/1987 | Juzswik | 318/341 |
| 4,808,994 | 2/1989 | Riley | 340/825.57 |
| 4,827,369 | 5/1989 | Saletta et al. | 361/96 |
| 4,996,646 | 2/1991 | Farrington | 364/483 |
| 5,247,450 | 9/1993 | Clark | 364/473 |
| 5,281,956 | 1/1994 | Bashark | 340/660 |

*Primary Examiner*—Emanuel T. Voeltz
*Assistant Examiner*—Kyle J. Choi
*Attorney, Agent, or Firm*—David Russell Stacey; Larry T. Shrout; Larry I. Golden

[57] ABSTRACT

A modular circuit interrupter is arranged for interrupting current in a three-phase circuit path providing current from a three-phase source to a three-phase motor. The interrupter includes a contactor unit arranged to interrupt the circuit path in response to a trip command; a current inducer circuit for providing a current signal having a magnitude corresponding to the current in the circuit path; a fault detection circuit responsive to the current signal, for detecting and communicating power faults in the circuit path; and start and stop motor modules. Respective housings are provided for each of the contactor unit, the fault detection circuit, the start motor module and the stop motor module. A data/power communication bus provides a data communication link between each of the contactor unit, the fault detection circuit, the start motor module and the stop motor module. The data/power communication bus also includes power and ground leads for providing power to the contactor unit and the fault detection circuit. The fault detection circuit sends the trip command over the data communication link, and the contactor unit includes decoding circuitry for responding by interrupting the circuit path.

23 Claims, 4 Drawing Sheets

DECENTRALIZED, MODULAR TRIPPING ARRANGEMENT

RELATED INFORMATION

This is a file wrapper continuation of application Ser. No. 08/144,089, filed Oct. 27, 1993, now abandoned, which is a continuation-in-part of U.S. patent application No. 07/626,669, entitled "Circuit Breaker Having Serial Data Communication", filed Feb. 5, 1991, which is a divisional of U.S. patent application No. 175,992, entitled "Microprocessor-Controlled Circuit Breaker And System", filed Mar. 31, 1988, now U.S. Pat. No. 4,996,646, and incorporated by reference in its entirety.

FIELD OF THE INVENTION

The present invention relates generally to circuit interruption arrangements and, more particularly, to tripping arrangements, such as circuit breakers and overload relays.

BACKGROUND OF THE INVENTION

Use of circuit breakers is widespread in modern-day residential, commercial and industrial electric systems, and they constitute an indispensable component of such systems toward providing protection against over-current conditions. Various circuit breaker mechanisms have evolved and have been perfected over time on the basis of application-specific factors such as current capacity, response time, and the type of reset (manual or remote) function desired of the breaker.

One type of circuit breaker mechanism employs a thermo-magnetic tripping device to "trip" a latch in response to a specific range of over-current conditions. The tripping action is caused by a significant deflection in a bi-metal or thermostat-metal element which responds to changes in temperature due to resistance heating caused by flow of the circuit's electric current through the element. The thermostat metal element is typically in the form of a blade and operates in conjunction with a latch so that blade deflection releases the latch after a time delay corresponding to a predetermined over-current threshold in order to "break" the current circuit associated therewith.

Another type of circuit interruption arrangement, useful for interrupting circuits having higher current-carrying capacities, uses current transformers to induce a current corresponding to the current in the circuit path, and an electronic circuit monitoring this induced current to detect power faults in the circuit path. In response to a power fault being detected, the electronic circuit generates a control signal to actuate a solenoid (or equivalent device) to cause the circuit-interrupting contacts to separate and interruption of the circuit path. The electronic circuits detecting the faults may or may not employ a microcomputer for flexibility and added intelligence for controlling the switching operations.

Known tripping arrangements do not, however, provide for an effective communications network between the electronic circuit monitoring for faults in the communication line and a central control point. Moreover, known tripping arrangements heretofore have been implemented using relatively large and expensive components.

Accordingly, there is a need for a circuit interruption arrangement which overcomes the aforementioned shortcomings.

SUMMARY OF THE INVENTION

The present invention provides a decentralized circuit interrupter arrangement for interrupting current in a circuit path using a data communication bus for passing control commands between interconnected portions of the arrangement.

The present invention also provides a circuit interruption arrangement useful for control systems incorporating network communications. This invention offers an inexpensive overload relay implementation which provides remote communication and control, remote and local diagnostic indicators, and remote and local reset features.

In one implementation of the present invention, a modular circuit interrupter arrangement for interrupting current in a multi-phase circuit path providing current from a multi-phase source to a multi-phase load, includes: a contactor unit arranged to interrupt the circuit path in response to a trip command; a current inducer circuit for providing a current signal having a magnitude corresponding to the current in the circuit path; a fault detection circuit responsive to the current signal, for detecting and communicating power faults in the circuit path; respective housings for each of the contactor unit and the fault detection circuit; and a data/power communication bus providing a data communication link between the contactor unit and the fault detection circuit and providing power to the contactor unit and the fault detection circuit. The fault detection circuit is constructed and arranged to send the trip command over the data communication link, and the contactor unit responds by interrupting the circuit path.

As an application, the present invention includes using an intelligent overload relay over the network which is programmed to communicate on the network such that a backup system is started if the overload relay needs to shut down the primary system. The motor system experiencing the fault can be sacrificed (not tripping the overload) if the process being controlled is more critical than the motor.

The above summary of the present invention is not intended to represent each embodiment, or every aspect, of the present invention. This is the purpose of the figures and the detailed description which follow.

BRIEF DESCRIPTION OF THE DRAWINGS

Other objects and advantages of the invention will become apparent upon reading the following detailed description and upon reference to the drawings in which.

Figure 1:
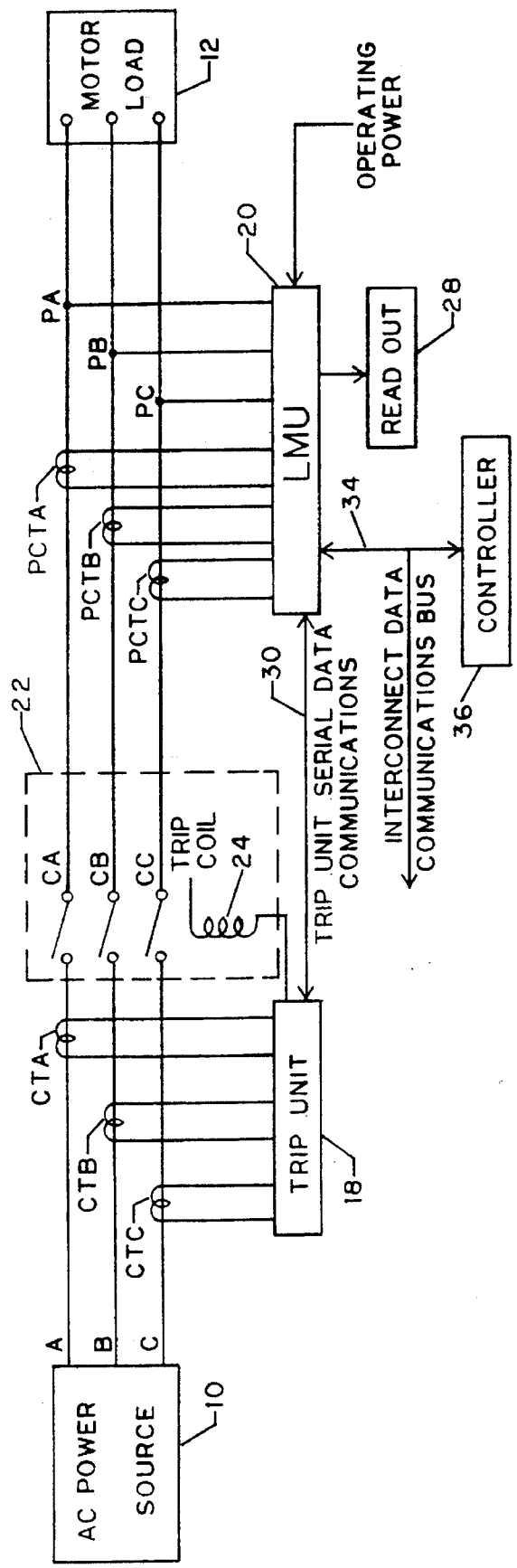
FIG. 1 is a block diagram of a circuit interruption system, in accordance with the present invention.

While the invention is susceptible to various modifications and alternative forms, specific embodiments thereof have been shown by way of example in the drawings and will be described in detail. It should be understood, however, that it is not intended to limit the invention to the particular form described. On the contrary, the intention is to cover all modifications, equivalents and alternatives falling within the spirit and scope of the invention as defined by the appended claims.

DETAILED DESCRIPTION OF THE FIGURES

FIG. 1 illustrates a modular circuit interruption arrangement, embodying the principles of the present invention, for monitoring and controlling three-phase current in a circuit path via conductors A, B, C connecting an AC power source 10 and a load 12, for example, a three-phase motor. Using a set of current transformers, CTA, CTB and CTC, a proportional current signal is induced from the three-phase current for measurement and fault-analysis by a trip unit 18. The trip unit 18 controls a circuit breaker unit 22, including contacts CA, CB, and CC, to effect the interruption of current flow in their respective conductors when a trip coil 24 is energized by the trip unit 18. The trip coil 24 is energized by the trip unit 18 whenever current flow in conductors A, B and C exceeds predetermined values. For example, if a short circuit, phase loss, ground fault or other overload develops in the load, the trip unit 18 will energize the trip coil 24 and open contacts CA, CB, CC to isolate the fault. The circuit breaker unit 22 can also be implemented as a contactor unit using, for example, Square D Class 8502, Type SA012 contactors, with a network interface attached.

A serial communications data bus 30 is used for communications between the trip unit 18 and a local management unit (LMU) 20. The trip unit 18 transmits, using a predetermined data communications protocol, information including the following: fault conditions including phase and balance pickup or trip, ground fault pickup or trip, short time pickup or trip, long time pickup or trip, 90% of long time pickup, instantaneous pickup or trip, if a trip is occurring, a ground fault pickup condition, a short time pickup condition, a long time pickup condition, an instantaneous pickup condition, whether a self-test trip occurred, current levels in phase A, phase B, and phase C, ground fault current, the option of trip unit or motor protection unit for which the trip unit is set, sensor and plug identifiers, positions of selector switches for long-time delay, long-time pickup, short time delay, short time pickup, ground fault delay, ground fault pickup, instantaneous pickup, phase and balance percent switch, long-time trip memory, the cause of the last trip, the current at the last trip, and other pertinent circuit breaker or overload relay data. This communication may be implemented using, for example, a cyclically-transmitted 31-BYTE data stream, as described in the parent case, U.S. patent application Ser. No. 07/626,669, now abandoned.

The LMU 20 also receives induced current input signals from precision current transformers PCTA, PCTB, PCTC, and optional connections PA, PB, PC for connecting the LMU 20 directly to the three-phase circuit path. The LMU 20 measures current flow, power, reactive power, and phase factor in conductors A, B, C. The LMU measures these quantities to an accuracy necessary for metering purposes as, for example, one percent. A read-out display 28 provides a display of the various quantities measured and computed by the LMU 20 for observation by an operator.

The LMU 20 can also command the trip unit 18 to actuate the solenoid (trip coil) 22 over the bus 30, which can be desirable if the LMU detects a fault condition using its more precise current transformers PCFA, PCTB, PCTC or if a command to trip is received over an interconnect data communications bus 34 from a controller 36 or from another LMU. The interconnect data communications bus 34 may be implemented using a linear data bus, an RS232-type, an RS422-type or other standard communications method.

Operating power for the trip unit can be supplied by current derived from the current transformer CTA, CTB, CTC or from an external power source. Power for operation of the LMU 20 and the other modular blocks shown in FIG. 1 are preferably supplied by an external power source.

By using data communication to control the operation of each of the various data blocks shown in FIG. 1, the circuit interruption arrangement can be implemented in individually-housed modules to permit a more customized approach to various types of applications. For example, the read out display 28, the controller 36 and/or even the LMU 20 may be optional circuits selected by the customer based on the intended application and the required complexity of the circuit interruption system. Further, in the more complex applications requiring external power for operating the LMU 20, the need for a power supply circuit within the trip unit 18 is eliminated by connecting the LMU power to the trip unit 18 as part of the wiring for the serial communications data bus 30.

Figure 2:
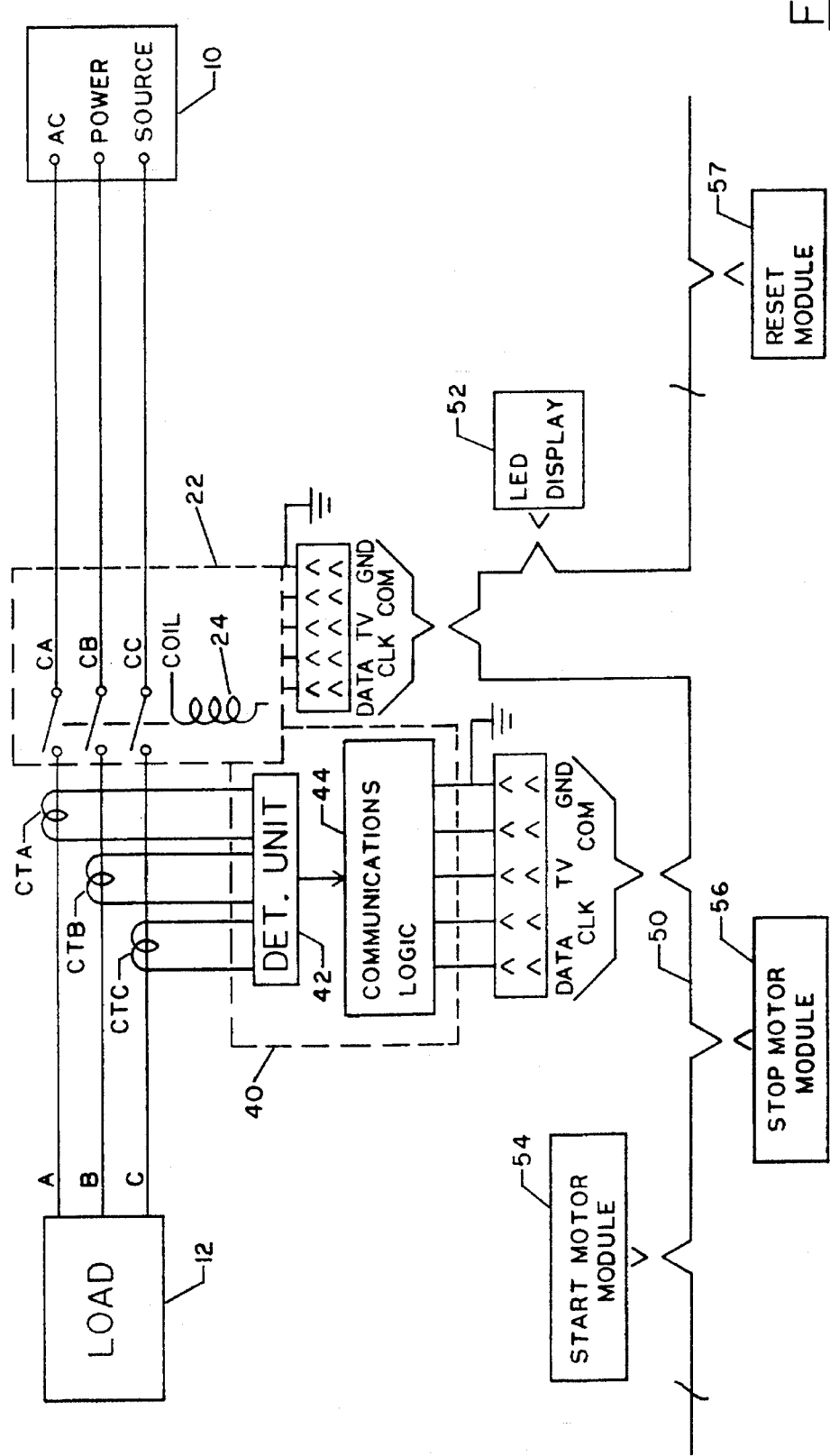
FIG. 2 is a block diagram of an alternative circuit interruption system, in accordance with the present invention.

In FIG. 2, an alternative modular circuit interruption arrangement is shown for monitoring and controlling three-phase current in conductors A, B, C which connect the AC power source 10 and the three-phase motor load 12. In this arrangement, a monitoring unit 40 includes a detection unit 42 and a communications logic circuit 44 for detecting overload and phase-loss conditions in the three-phase circuit path and for communicating status and command signals in response to these conditions over a data communication bus 50.

The data communication bus 50 provides the necessary control and power to each of the modules (or blocks) shown in FIG. 2, thereby permitting these modules to be implemented without separate power supplies and to be separately housed. Thus, the data communication bus 50 is used by the monitoring unit 40 to actuate the coil 24 in the contactor unit 22 and/or to display the status of the monitoring unit 40 on an LED display unit 52. One of the advantages of this invention is that it eliminates the need for a solenoid which trips (or drops-out) the contactor.

By using diagnostic LEDs and associated LED drivers, the monitoring arrangement of FIG. 2 can locally (and remotely) indicate such conditions as power on, tripped, overcurrent fault, and phase loss fault.

The data communication bus 50 is also used in connection with a start motor module 54 and a stop motor module 56 for control over the start up switching and manual interruption of the circuit path to the motor load 12. These modules 54 and 56 may also be implemented as a single module having separate address assignments for the bus. When the detection unit 42 detects an overload condition, a trip command is sent over the data communication bus 50. Using decoding circuitry within the network interface module and attached to the contactor unit 22, the trip command is detected and power is removed from the coil 24 to interrupt the circuit path in the conductors A, B and C. The contactor then drops out and the seal around the start button (not shown) in the start up module is opened. Due to the power typically required, the operating power for the contactor coil is not provided over the bus but rather from an external power source. Therefore, the signal is isolated (typically using an opto-coupler) from the coil power system.

The data communication bus 50 may be implemented using any of a variety of data communication protocols, such as those previously discussed. For optimizing control with a minimal amount of decoding circuitry within each data-interfacing module of FIG. 2, a Seriplex-type protocol is preferred. Such a protocol is illustrated and described in U.S. Pat. No. 4,808,994, entitled "Logic Interchange System" (Riley). Hence, the decoding circuitry within each data-interfacing module of FIG. 2 is preferably implemented in accordance with the teachings of aforementioned U.S. Pat. No. 4,808,994, entitled "Logic Interchange System".

For Seriplex-type communication, power for the electronics in each of the illustrated modules is supplied over a lead on the bus 50 using a 12 to 24 VDC regulated supply (not shown) and since the power supply supplies 10–20 mA on the average for each node on the bus, it not uncommon for the supply to be capable of providing several amps. When an overload condition is detected, the trip level comparator provides an active input to one of the inputs of the Seriplex ASIC. The ASIC then latches the tripped input by constructing a set/reset latch. For detail on an exemplary implementation of such a latch, reference may be made to U.S. patent application Ser. No. 08/099,788, entitled "Feed-forward Control System, Method and Control Module", filed on Jul. 30, 1993, and incorporated herein by reference. This tripped signal is then broadcast over the network and by appropriately addressing the contactor module, it will read this input and trip the contactor. This module is the same one that will pick up and drop out the contactor upon commands from the push buttons in the start and stop motor modules, respectively. Therefore, the output contacts or devices need not be duplicated to perform control and protection functions.

By adding a reset pushbutton module 57 to the communication bus (50) network and addressing the reset pushbutton module for the reset input of the latch created by the ASIC in the monitoring module 40, the trip condition may be reset. Reset modules may be added anywhere on the network to reset as many circuit interruption arrangements as desired by appropriately addressing the modules.

The protocol used over the bus 50 should be fast and predictable. Since the protocol is used to perform the primary protection function of an overload relay (i.e., dropping out the contactor), Seriplex can be used to provide an action-response delay time which is insignificant when compared to the time to detect a trip condition and effect a trip. For example, in the illustrated embodiment of FIG. 2, the network delay time is less than 1 millisecond, and this is insignificant when compared to a Class 10 overload relay which may trip at 6 times the current limit in approximately 6 to 10 seconds.

Seriplex also has the advantage of communicating analog values, such as current level, over the network. By adding some circuitry around the ASIC, Seriplex will convert the analog information to a digital word, and insert it on the network over multiple bits in the data stream. For example, a 8 bit digital representation will take 8 bits in the data stream.

Figure 3:
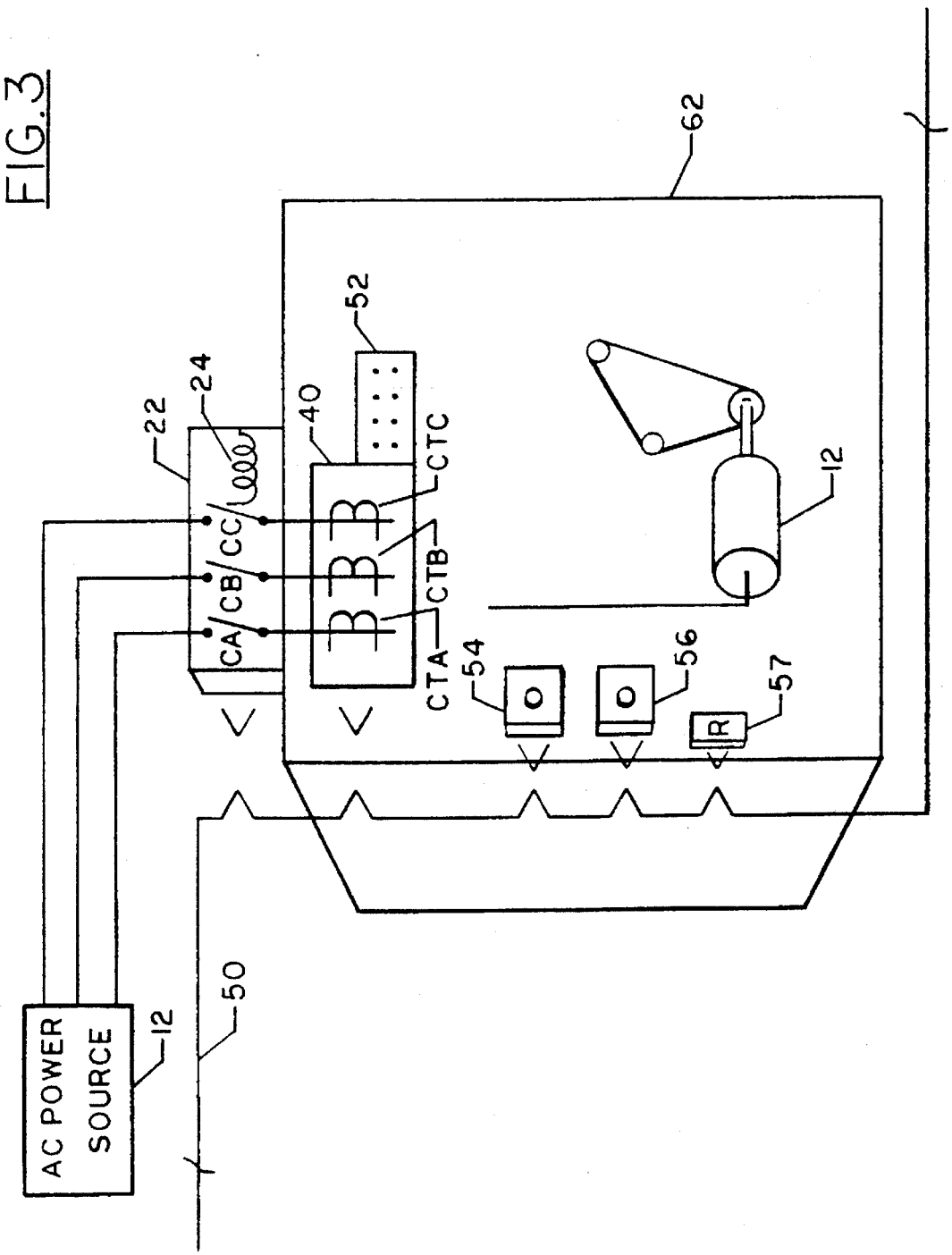
FIG. 3 is a perspective illustration of the modular components of FIG. 2 arranged and mounted for use in an industrial application.

Referring now to FIG. 3, the modular circuit interruption arrangement of FIG. 2 is shown from a perspective view for a specific industrial application. A conventional motor-operated industrial machine 62 is shown including the monitoring and display units 40 and 52 in respective housings mounted on top of the industrial machine 62, with the contactor unit 22 mounted just below the monitoring unit 40. The start motor module 54 and the stop motor module 56 are also shown in separate housings and mounted at a user-accessible position on the industrial machine 60. A remote reset module 57 may also be used and coupled via the bus 50. The data communication bus 50 provides power (V+, common and/or ground) and the serial data and clock lines to each of the monitoring and display units 40 and 52, the contactor unit 22, and the start and stop motor module 54 and 56.

A more typical application might have items 52, 54, and 56 mounted on a control panel remotely located from the machine 62.

Figure 4:
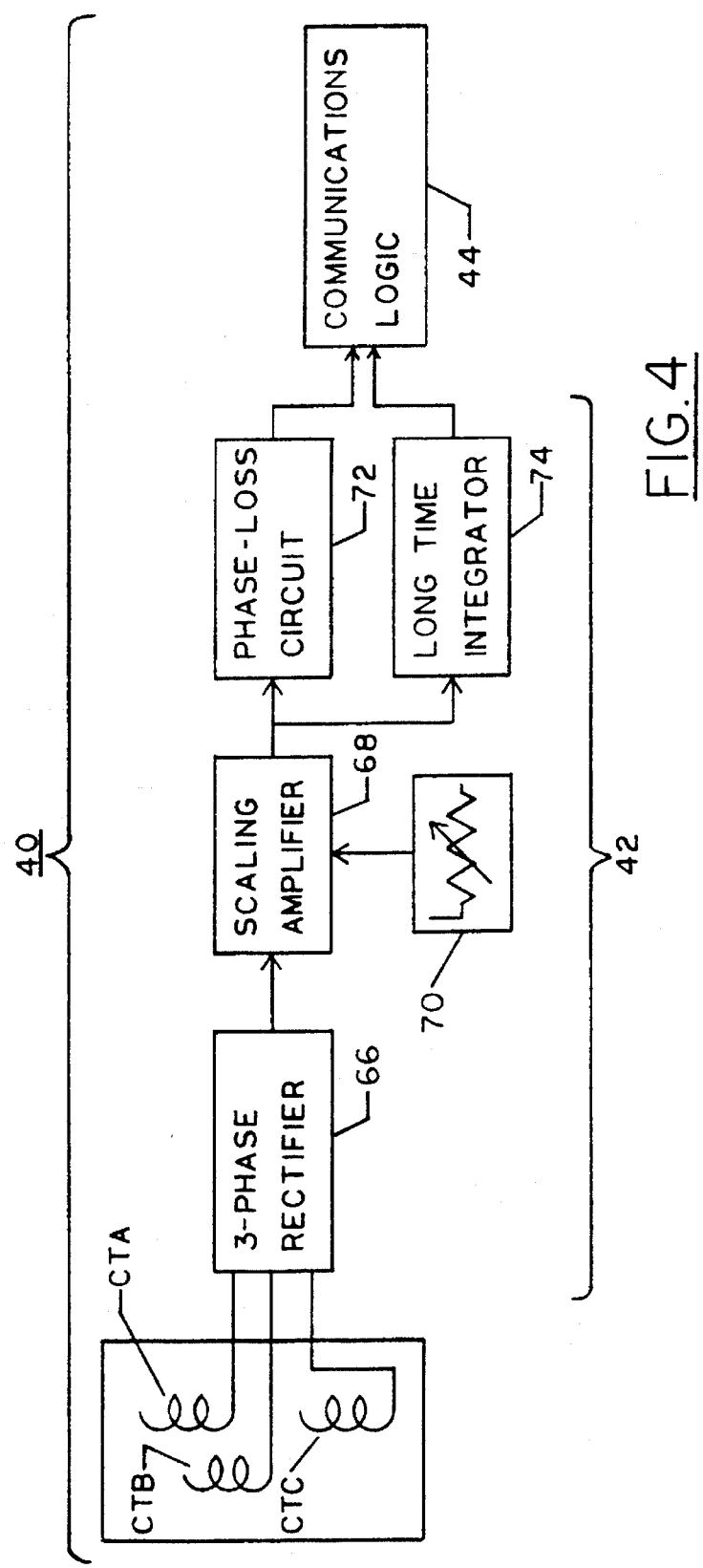
FIG. 4 is an exploded view of a portion of the circuit interruption arrangement of FIG. 2.

FIG. 4 provides an exploded view of the monitoring unit 40 of FIGS. 2 and 3. A current signal having a magnitude proportional to the current from the three-phase lines is induced by the current transformers CTA, CTB and CTC and the current signal is then rectified by a three-phase rectifier 66. The outputs of the three-phase rectifier 66 are scaled by a scaling amplifier 68, with the set point for the current trip level adjusted manually using an FLA (Full Load Amperage) adjustment potentiometer 70. The monitoring unit 40 is designed to send a trip command in response to detecting current levels between 100% and 125% of the full load current, depending on the dial setting selected by the user.

From the scaling amplifier 68, faults in the three-phase circuit path are detected using a phase loss circuit 72 and an overload detector 74. The phase loss detector 72 protects the motor from overheating when current in one of the phases is lost (i.e., interrupted or grossly unbalanced with respect to the other two phases). The overload detector 74 functions as an overload timer monitoring a three-phase current condition in which the motor is drawing an excessive amount of current for a predetermined period of time. The phase loss and overload conditions can occur separately or in conjunction with one another.

The monitoring unit 40 is preferably implemented as a single chip using ASIC (application specific integrated circuit) technology, and using essentially the same circuitry described for each of the blocks shown in FIG. 4 as illustrated and described in U.S. patent application Ser. No.08/143,948, filed Oct. 27, 1993, entitled "Self-Powered Circuit Interruption Arrangement", filed currently herewith, incorporated herein by reference, assigned to the instant assignee and incorporated herein by reference. The communications logic 44 is preferably implemented in accordance with the teachings of aforementioned U.S. Patent No. 4,808,994, entitled "Logic Interchange System".

Those skilled in the art will readily recognize that various modifications and changes may be made to the present invention without strictly following the exemplary circuits illustrated and described herein and without departing from the true spirit and scope of the present invention, which is set forth in the following claims.

What is claimed is:

1. A modular circuit interrupter arrangement for interrupting current in a multi-phase circuit path providing current from a multi-phase source to a multi-phase load, comprising:

a contactor unit arranged to interrupt the multi-phase circuit path in response to a trip command;

a current inducer circuit for providing a current signal having a magnitude corresponding to the current in the multi-phase circuit path;

a fault detection circuit unit including responsive to the current signal, for detecting and communicating power faults in the multi-phase circuit path;

respective housings for each of the contactor unit and the fault detection circuit; and a data/power communication bus providing a data communications link between the contactor unit and the fault detection circuit and providing power to the contactor unit and the fault detection circuit, the fault detection circuit constructed and arranged to send the trip command over the data communication link, and the contactor unit responding by interrupting the multi-phase circuit path.

2. A modular circuit interrupter arrangement, according to claim 1, wherein the data/power communication bus is implemented using a Seriplex communication protocol.

3. A modular circuit interrupter arrangement, according to claim 1, wherein the data/power communication bus includes at least two power lines and a serial data line.

4. A modular circuit interrupter arrangement, according to claim 3, wherein the data/power communication bus includes a data clock line.

5. A modular circuit interrupter arrangement, according to claim 1, wherein the fault detection circuit includes a phase fault detection circuit.

6. A modular circuit interrupter arrangement, according to claim 1, wherein the fault detection circuit includes an overload detection circuit.

7. A modular circuit interrupter arrangement, according to claim 1, wherein the fault detection circuit includes a phase fault detection circuit and an overload detection circuit.

8. A modular circuit interrupter arrangement, according to claim 1, further including a stop motor module connected to and communicating on the data/power communication bus.

9. A modular circuit interrupter arrangement, according to claim 1, further including a start motor module connected to and communicating on the data/power communication bus.

10. A modular circuit interrupter arrangement, according to claim 1, further including a start and stop motor module connected to and communicating on the data/power communication bus.

11. A modular circuit interrupter arrangement, according to claim 1, further including a reset module communicating on the data/power communication bus.

12. A modular circuit interrupter arrangement, according to claim 11, further including start and stop motor modules connected to and communicating on the data/power communication bus.

13. A modular circuit interrupter arrangement for interrupting current in a three-phase circuit path providing current from a three-phase source to a three-phase motor, comprising:

a contactor unit arranged to interrupt the three-phase circuit path in response to a trip command;

a current inducer circuit for providing a current signal having a magnitude corresponding to the current in the three-phase circuit path;

a fault detection circuit unit including responsive to the current signal, for detecting and communicating power faults in the three-phase circuit path;

at least one module providing start and stop motor functions and an overload reset function;

respective housings for each of the contractor unit, the fault detection circuit, and said at least one module;

a data/power communication bus providing a data communication link between each of the contractor unit, the fault detection circuit, said at least one module, and providing power to the contactor unit and the fault detection circuit, the fault detection circuit constructed and arranged to send the trip command over the data communication link, and the contactor unit responding by interrupting the three-phase circuit path.

14. A modular circuit interrupter arrangement, according to claim 13, wherein the data/power communication bus includes a single data clock line and a single data line.

15. A modular circuit interrupter arrangement, according to claim 13, wherein the fault detection circuit includes a phase fault detection circuit.

16. A modular circuit interrupter arrangement, according to claim 15, wherein the fault detection circuit includes an overload detection circuit.

17. A modular circuit interrupter arrangement, according to claim 16, wherein the fault detection circuit includes a three-phase rectifier circuit.

18. A modular circuit interrupter arrangement, according to claim 17, wherein the fault detection circuit includes a scaling amplifier.

19. A modular circuit interrupter arrangement, according to claim 18, further including a potentiometer for setting a trip point for the fault detection circuit.

20. A modular circuit interrupter arrangement, according to claim 13, wherein said functions provided by said at least one module have respective corresponding addresses for communicating on the data/power communication bus.

21. A modular circuit interrupter arrangement, according to claim 13, wherein the fault detection circuit is implemented using ASIC technology.

22. A modular circuit interrupter arrangement, according to claim 13, further including a potentiometer for setting a trip point for the fault detection circuit.

23. A modular circuit interrupter arrangement, according to claim 13, wherein the fault detection circuit includes an overload detection circuit.

* * * * *